Sept. 2, 1969     M. W. THOMPSON ET AL     3,464,468
TREE SHEARING, TOPPING, AND DELIMBING APPARATUS
Filed Jan. 31, 1968     9 Sheets-Sheet 2

INVENTORS
MAX W. THOMPSON
WILBURN W. DACUS
BY Semmes and Semmes
ATTORNEYS

Sept. 2, 1969   M. W. THOMPSON ET AL   3,464,468
TREE SHEARING, TOPPING, AND DELIMBING APPARATUS
Filed Jan. 31, 1968   9 Sheets-Sheet 4

INVENTORS
*MAX W. THOMPSON*
*WILBURN W. DACUS*
BY *Semmes and Semmes*
ATTORNEYS

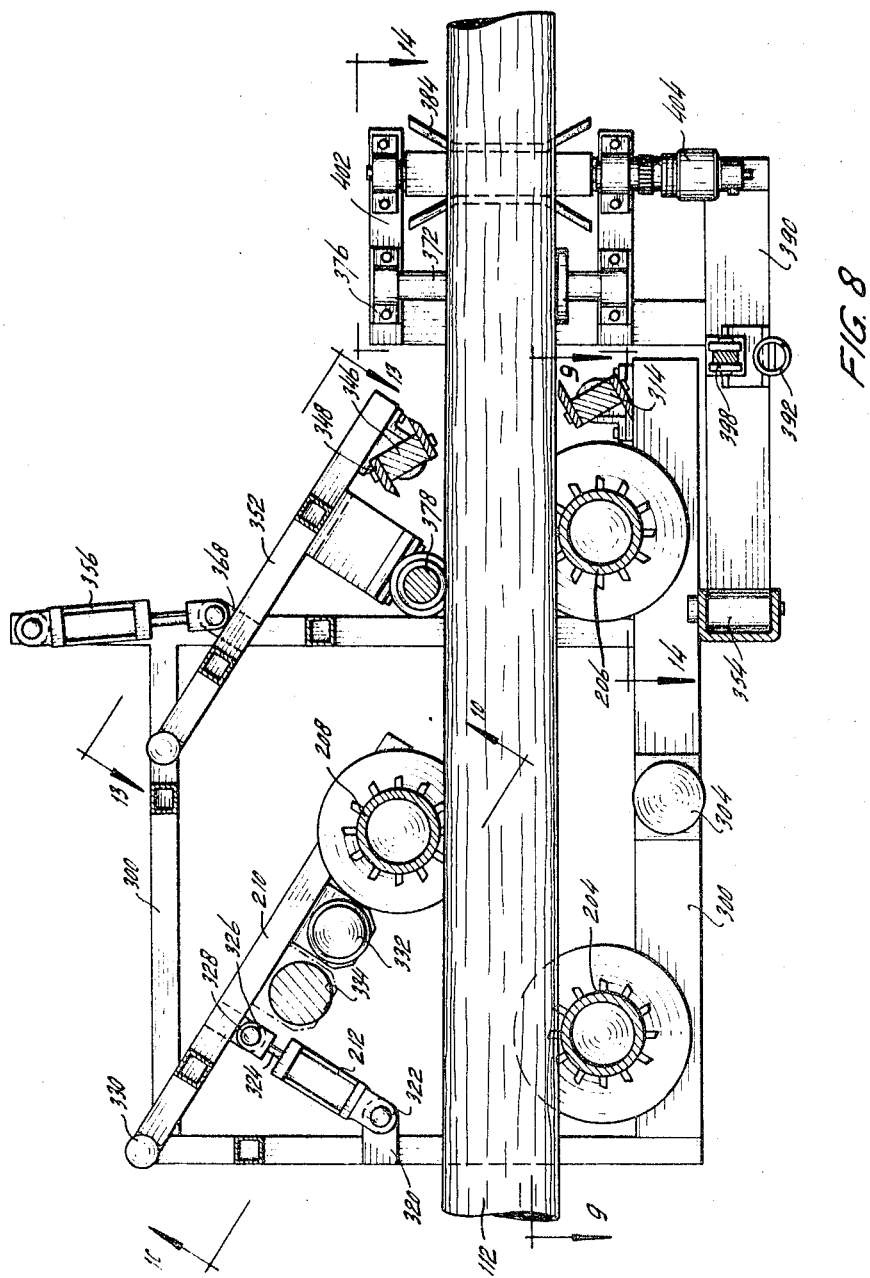

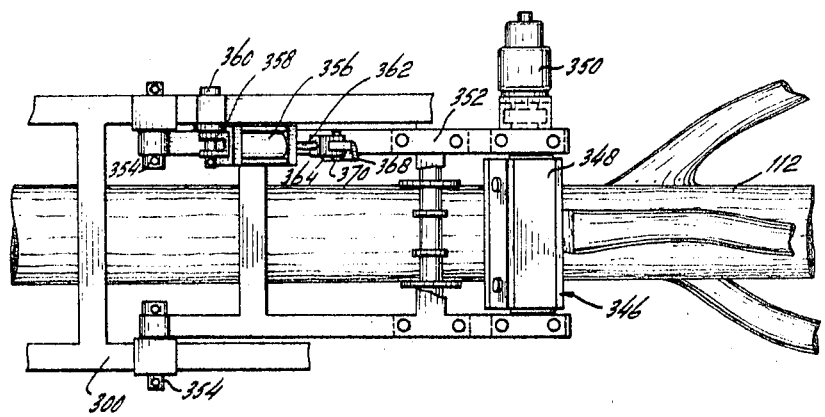
FIG. 13
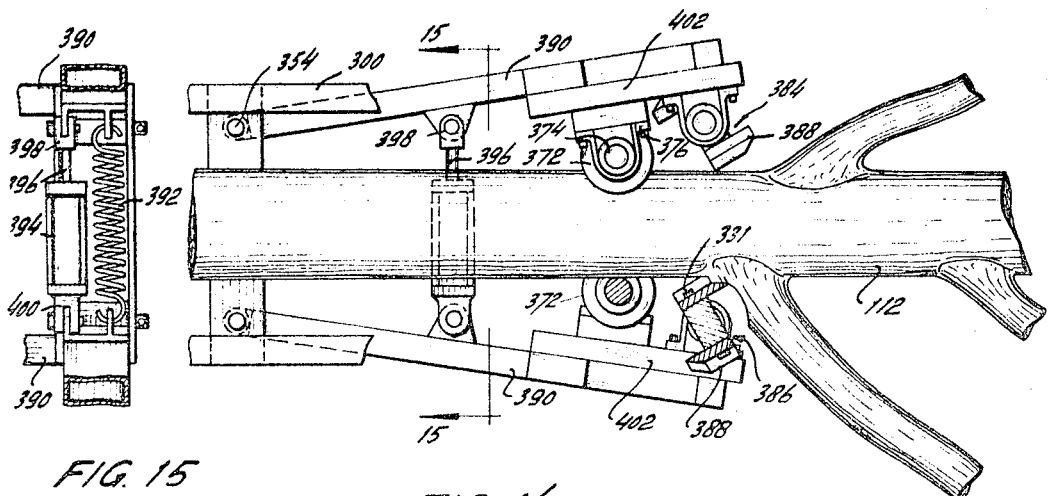
FIG. 15
FIG. 14

United States Patent Office 3,464,468
Patented Sept. 2, 1969

3,464,468
TREE SHEARING, TOPPING, AND DELIMBING APPARATUS
Max W. Thompson, Brandon, and Wilburn W. Dacus, Jackson, Miss., assignors to Future Products, Inc., Jackson, Miss., a corporation of Arkansas
Filed Jan. 31, 1968, Ser. No. 701,891
Int. Cl. B27c 9/00
U.S. Cl. 144—3           3 Claims

ABSTRACT OF THE DISCLOSURE

Apparatus for tree felling, topping and delimbing, particularly a combination tong, shear and rotating cutting knife device for felling and topping a tree trunk, grasping and axially advancing the trunk, and delimbing and bunching of delimbed trunks.

---

The present application is directed to the use of the shear and tong combination in connection with a delimbing conveyance, including driven rollers and cutting knives which peripherally engage the tree trunk within a path of axial conveyance.

BACKGROUND OF THE INVENTION

Field of the invention

Mobile tree felling devices have been widely developed with the goal of enabling felling by shearing and moving of the trees by a single bulldozer operator. For the most part, such mobile devices have been spectacularly complex and expensive and none have had the combined capabilities of shearing the tree top, topping the sheared trunk and, if desired, laterally displacing the trunk either to one side or axially of a mobile vehicle after shearing and topping. The capability of utilizing a tong device to assist both in the shearing and to accomplish the tree trunk topping and displacing action is not shown in the prior art. Furthermore, the capability of delimbing the sheared tree trunk and then bunching of sheared trunks—all by means of a single mobile vehicle, is not shown anywhere in the prior art.

Description of the prior art

The prior art teaches the employment of tractors or bulldozers together with pivotable shearing devices. Horncastle, 3,102,562, Bombardier 3,074,447 and Larson 3,238,981 utilize pivotable chain saw cutting devices.

The use of shearing knives together with tongs or grappling hooks, supporting the tree against the pressure of the shearing knives, is shown in Ingraham 2,612,194, Williams 3,340,912 and Ford, 2,748,813.

Busch 2,876,816, 2,981,301, 3,059,677, 3,196,911, 3,269,437 teaches the utilization of hydraulic systems for operation of both the tongs and shearing knives.

SUMMARY OF THE INVENTION

According to applicants' method, the tree being attacked is confined within a vertically pivoted cutting frame. Simultaneously with shearing the tree trunk may be rearwardly supported by a gate laterally pivoted across the end of the frame and, also, the tree may be pushed by a longitudinally extensible tong at a point spaced from the shearing. The sheared tree may then be lifted from the ground independently by grasping with the tongs or by upward pivoting of the frame and grasping with the tongs. The tree may be pinched so to speak between the tongs and pivoted frame gate, so as to be dragged or pulled longitudinally rearwardly from the place of shearing by movement of the vehicle. The tree may be topped by means of the shear blades inwardly radially cutting through the trunk. The trunk may then be laterally displaced by the pivoting gate means or longitudinally displaced by grasping with the tong and longitudinal movement of the tongs on the mobile vehicle.

Subsequent to shearing and felling and prior to topping, the sheared end of the felled tree may be advanced into a delimbing conveyance including a plurality of driven rollers and cutting knives peripherally urgeable against the tree trunk from all sides. As the rollers drive the trunk through a path of axial conveyance, the cutting knives delimb. Topping may be completed adjacent the cutting knives as delimbing is completed.

DESCRIPTION OF THE DRAWINGS

FIG. 8 is a side elevation; partially in section showing the pivotable frame used for tree shearing; the delimbing drive rollers and knives peripherally engaging tree trunk 112 advancing therethrough;

FIG. 13 is a fragmentary top plan showing the upper cutting knife assembly pivotable onto the top of a trunk being axially advanced;

FIG. 14 is a fragmentary top plan, partially in section, showing the side cutting knives being pivotably urged towards each other and against the sides of a trunk being axially advanced;

FIG. 15 is a vertical sectional view taken along section line 15—15 of FIG. 14, showing the tension spring and hydraulic cylinder means used for pivoting of the side cutting knives towards and away from the tree trunk;

DESCRIPTION OF THE PREFERRED EMBODIMENTS

Figure 1:
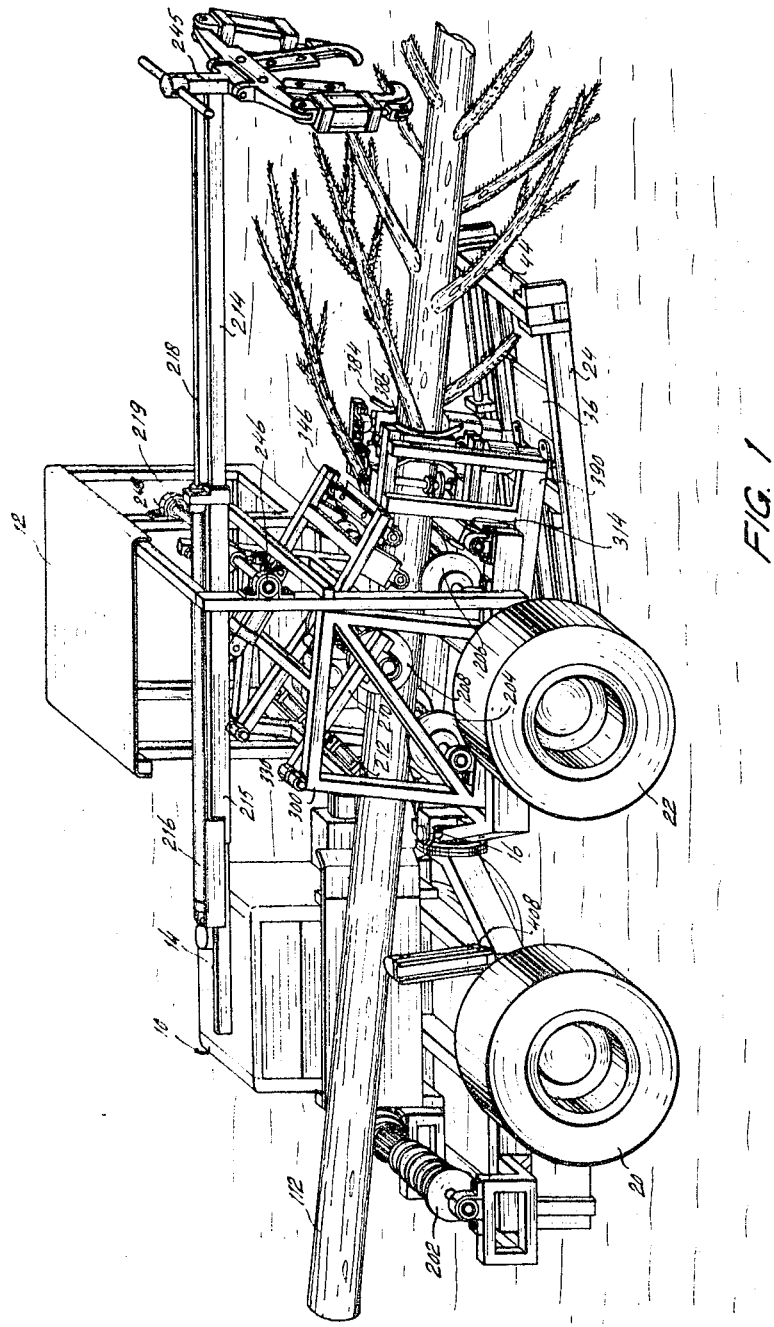
FIG. 1 is a perspective view of a mobile vehicle embodying the combination shear, tong and cutting knife device for felling, topping and delimbing.
Figure 5:
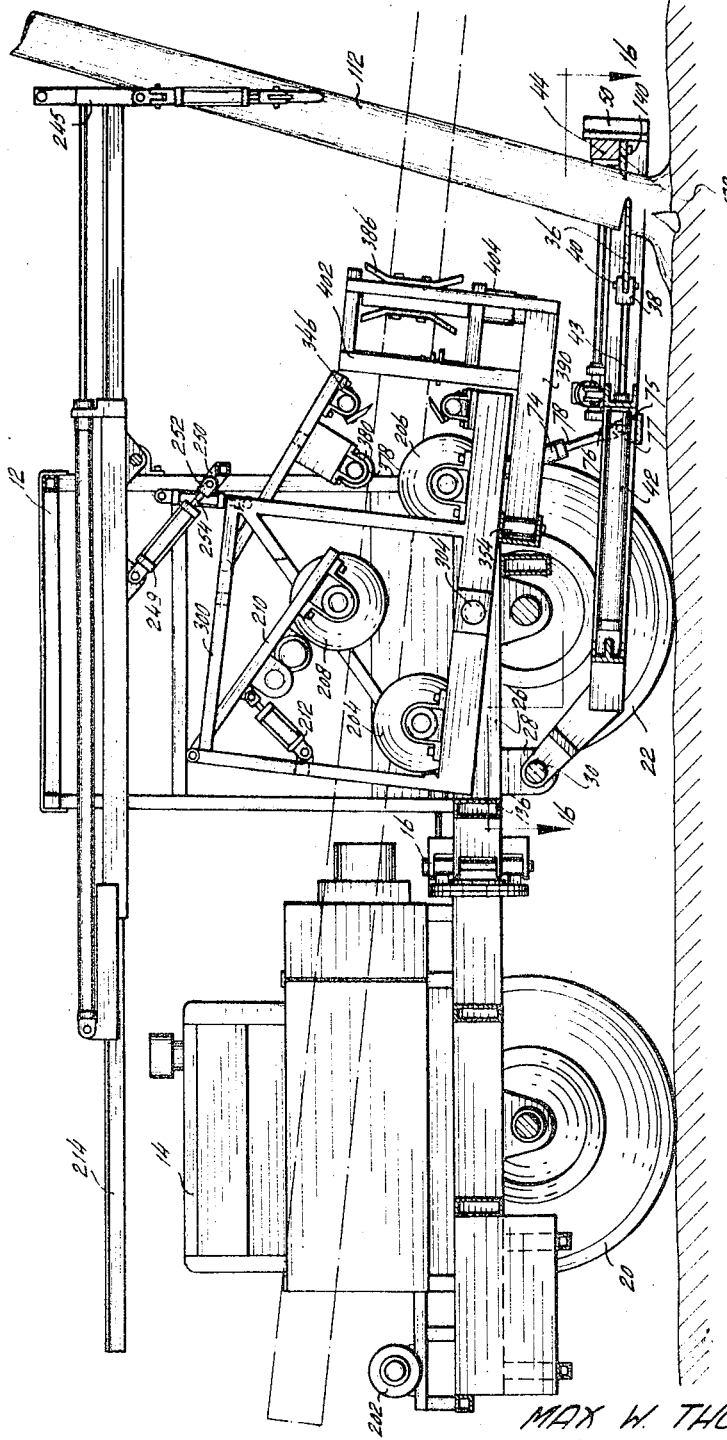
FIG. 5 is a side elevation of a proposed apparatus during shearing.
Figure 6:
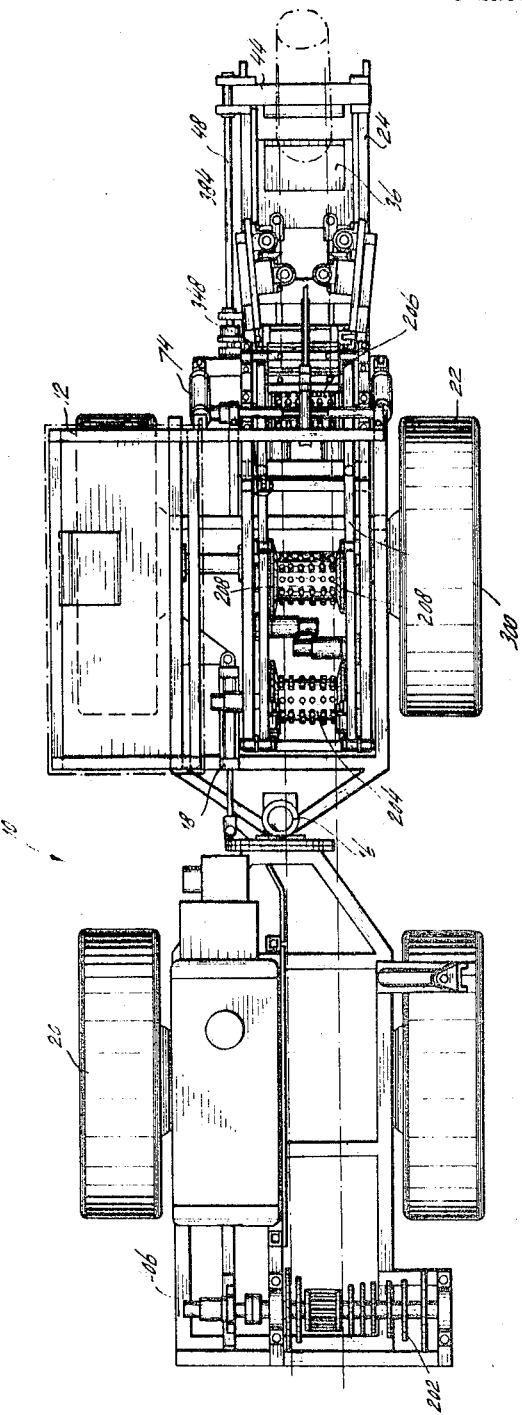
FIG. 6 is a top plan, the tree being sheared shown in phantom.
Figure 7:
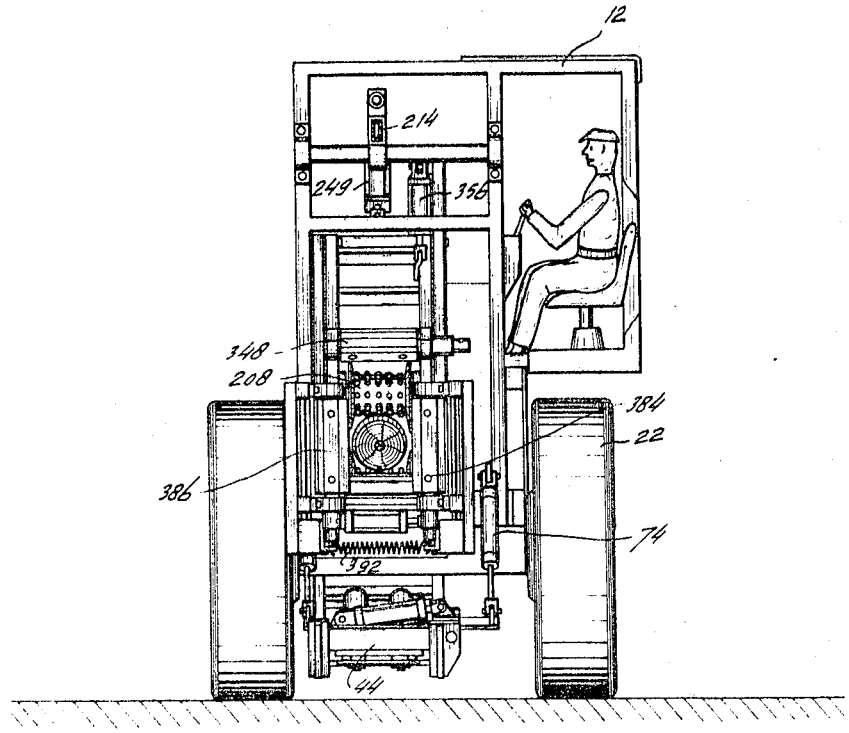
FIG. 7 is a end elevation showing the sheared trunk being advanced axially through the delimbing and cutting knives.

In FIGS. 1 and 5, mobile vehicle 10 is generally illustrated as comprising a cab section 12 and an engine section 14 pivoted to one another at 16 and articulated by means of a hydraulic cylinder 18 (shown in FIG. 6), the cab 12 and engine 14 components being supported, respectively, upon front wheels 22 and rear wheels 20.

Shear frame 24 may be pivoted to vehicle chassis 26 by means of pin 30 extending through ears 28. At its open end, frame 24 encloses shearing blade 36 supported in clevis elements 38 by means of pins 40, each clevis 38 being attached to the end of identical piston 42 extensible rods 43. Gate 44 is pivoted in the free end of frame 24 by means of pivoting bar 48 and vertical guide elements 50. The gate may include an axial tree conforming concavity and pivoted end inclined shoulder (not illustrated). Gate 44 may include a lower trunk engaging support blade 138 secured by means of bolts 140.

The frame pivoting mechanism includes a pair of identical cylinders 74, each secured to the cab support ear 80 by means of pin 82 and each having extensible piston rod 78 with clevis assembly 76, engaging support ear 75 by means of pin 77. As piston 74 is actuated, the frame may be pivoted up and down, so as to engage the tree trunk at the lowest possible point. As will be apparent, the blade is only three or four inches above ground, enabling cutting of the tree trunk three or four inches above ground and even lower than in the position illustrated in FIG. 5.

Figure 4:
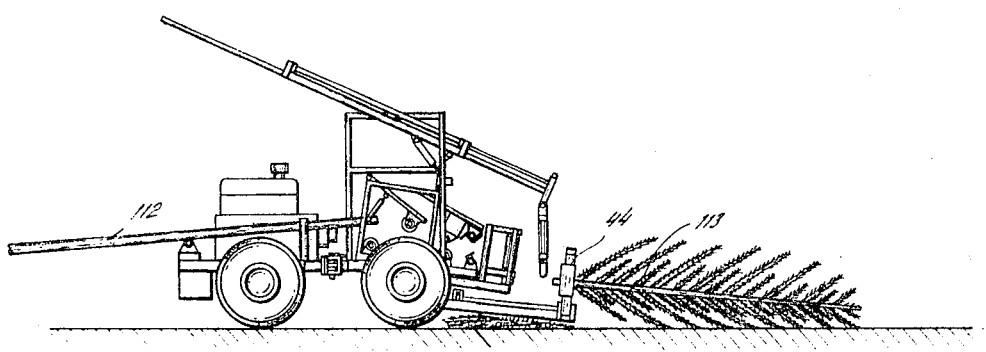
FIG. 4 is a schematic side elevation showing the delimbed trunk being axially advanced away from the machine and simultaneously with lateral displacement of the top.
Figure 16:
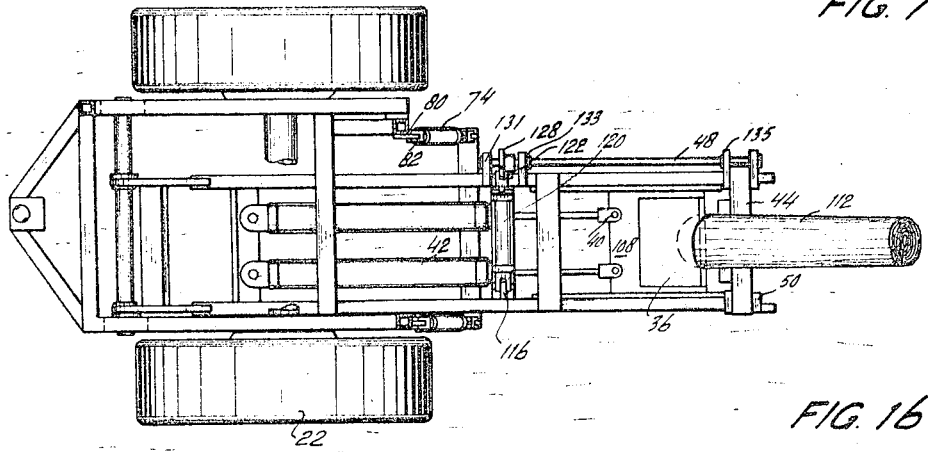
FIG. 16 is a top plan of the tree shearing knife assembly.

Gate 44 is illustrated in FIGS. 5 and 16 in gate closed position during shearing and in FIG. 4 in gate open position in lateral displacement of the sheared tree top 113. Gate 44 is pivoted by means of cylinder 120 secured at one end to frame support piece 116 and having a piston rod extending from its other end terminating in clevis assembly 122, engaging fin 128 secured to gate turning or pivoting rod 48, mounted rotatably by bushing in frame side elements 131, 133 and 135 and the vertical guides 50. Blade frame 108 may be attached to blade 36 rear and side edges as a fixture for clevis elements 40.

Figure 17:
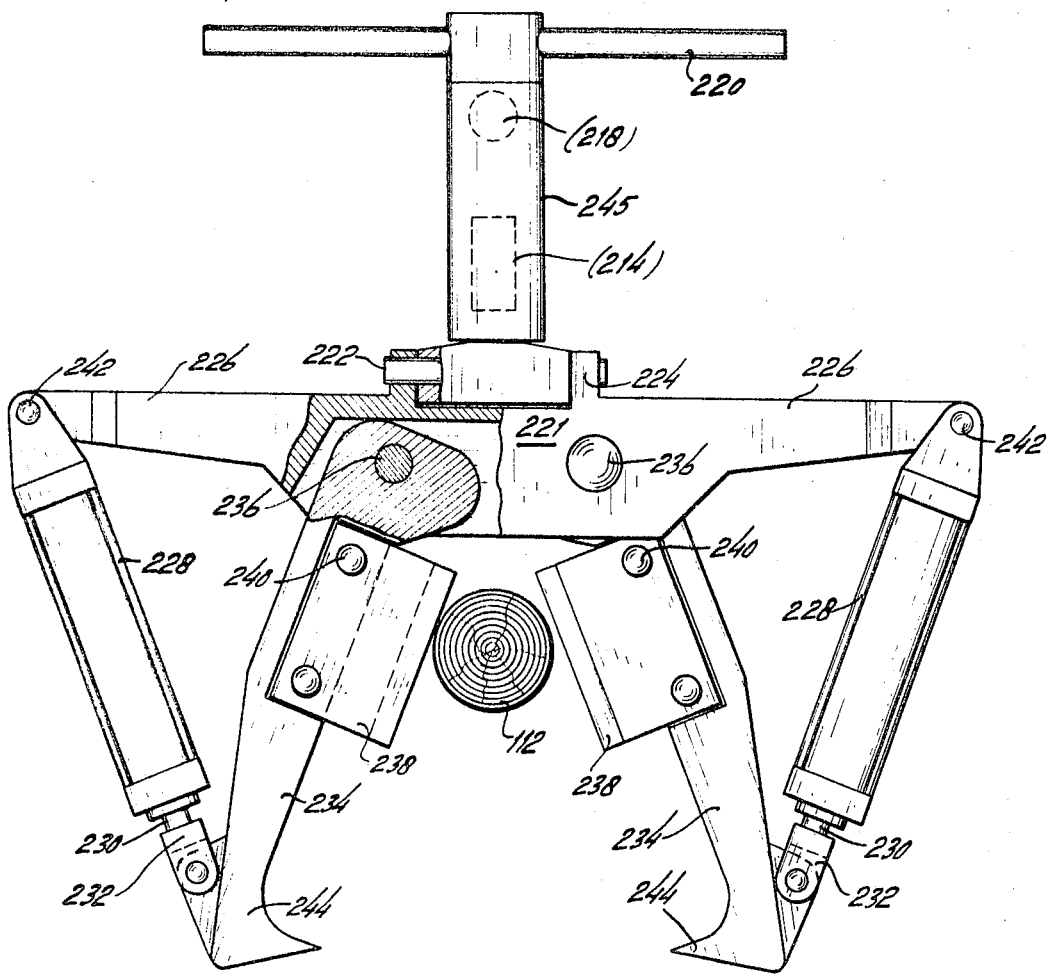
FIG. 17 is an enlarged front elevation of the tong preparatory to topping of tree 112.
Figure 18:
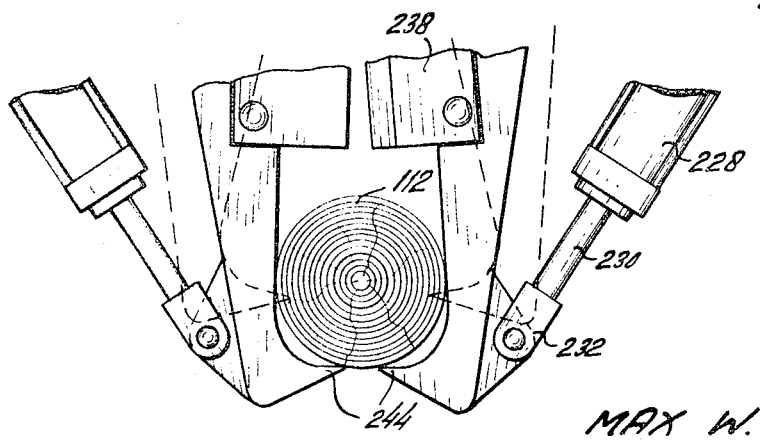
FIG. 18 is a fragmentary front elevation, showing the use of the tong hooks in grasping and lifting attitudes.

The present invention includes boom casing 215 pivoted around bar 219 and enclosing boom hydraulic cylinder 216 by means of guard elements 246 and 248. Piston rod 218 is coextensive from cylinder 216 with boom 214 which is movable within boom casing 215. Tong housing 245 is secured to the ends of piston rod 218 and boom 214 so as to be laterally pivotable with respect thereto. As illustrated in FIGS. 17 and 18 the tong assembly includes a base 224 with upper T-bar arms 220, base 224 being pivotally secured in tong bracket 226 by means of horizontal pin 222.

Individual piston cylinders 228 are suspended from the bracket arms 226 by pins 242 and include extensible piston rods 230 secured to the tong arms 234 by means of clevis arrangement 232. Tong arms 234 are pivoted to the bracket by pins 236 and include at their lower extremity an inwardly extending grappling point 244 and medial cutting blades 238 secured to the arm by rivets or bolts 240.

The entire boom assembly is pivoted vertically with respect to cab 12 by rotation of bar 219 by means of piston 249 secured at one end to cab 12 ear 250 by a clevis 252 and including an extensible piston rod 254. Piston 249 base clevis 256 is secured to cab ear 259 by pin 257.

Figure 2:
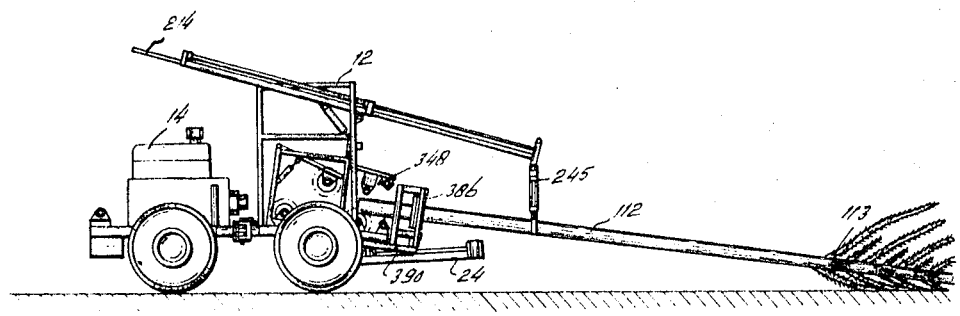
FIG. 2 is a schematic side elevation showing the admission of the sheared tree trunk end into the driven roller and cutting knife path of axial conveyance.
Figure 3:
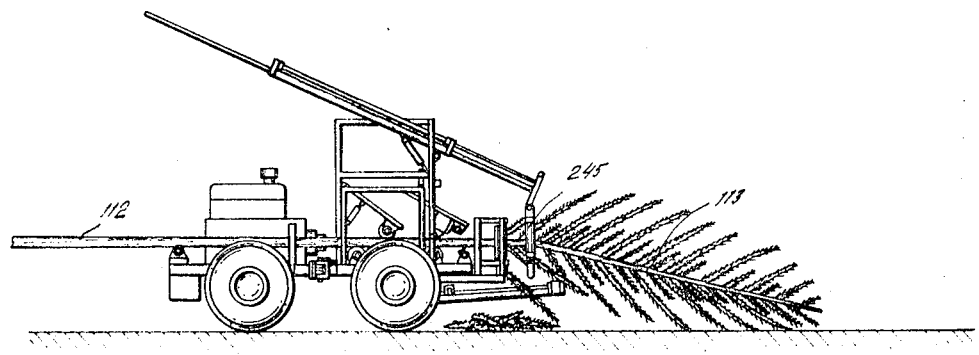
FIG. 3 is a schematic side elevation showing the tree trunk during the final stages of delimbing and at the moment of topping.

As illustrated in FIG. 5, the boom 215 may be raised by vertical extension of piston rod 254. In turn, and as illustrated in FIGS. 2, 3 and 4, boom casing 215 may be lowered by retraction of piston rod 254. Simultaneously with lowering of boom casing 215, the shearing blade frame 24 may be pivoted upwardly as in FIG. 4 so as to lift the severed tree 112 for grasping by the tong means.

In pushing the tree during severing as in FIG. 1 it is not essential that the tong arms 234 be separated apart as illustrated. In fact the flat forward surface 221 of tong bracket 226 is sufficient when the tong blades are closed with respect to each other to exert a sufficient pushing action on the tree to assist in felling.

Manifestly, the combined shearing and topping assembly may be attached to almost any type of mobile work vehicle. As illustrated in FIG. 1 there are shown advancing rollers 202, 204, and 206 which may be combined with a downwardly pivoting roller 208 secured in pivotable frame 210 and actuated downwardly to engage a severed trunk 112 by means of dual piston assembly 212.

As illustrated in FIGS. 1, 5 and 8, the delimbing device consists of a plurality of tree-engaging driving rollers 204, 206 and 208, as well as tree-engaging knives 314, 346, 384 and 386. The lower delimbing elements are mounted in frame 300 which is medially pivoted within the vehicle chassis of identical swivel elements 302 and 304. An optional rear end drive roller 202, powered by hydraulic motor 406, may be provided as an assistance in axially conveying the delimbed log away from the mobile vehicle.

Figure 9:
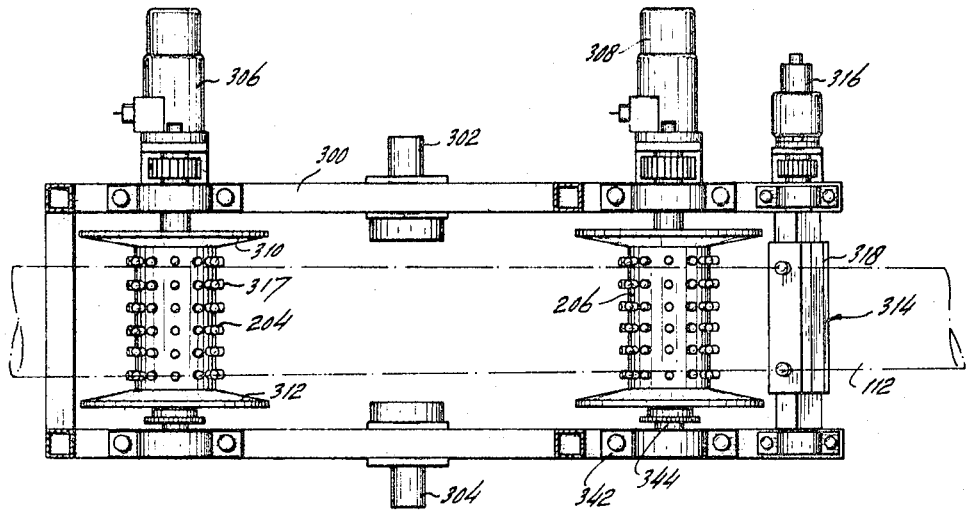
FIG. 9 is a top plan of the pivoting frame supporting the tree engaging lower drive rollers and lower cutting knife 314.

The lower tree-engaging delimbing elements are illustrated in FIG. 9, as comprising drive rollers 204 and 206, having identical side flanges 310 and 312 with radially extending studs or bullets 317, engaging the tree sides. Rollers 204 and 206 may be mounted upon identical shafts 344 supported by ball bearing means in brackets 342 and driven by their respective hydraulic drive motors 306 and 308. Lower delimbing knife 314 with removable blades 318 may be similarly mounted and driven by hydraulic motor 316.

Figure 10:
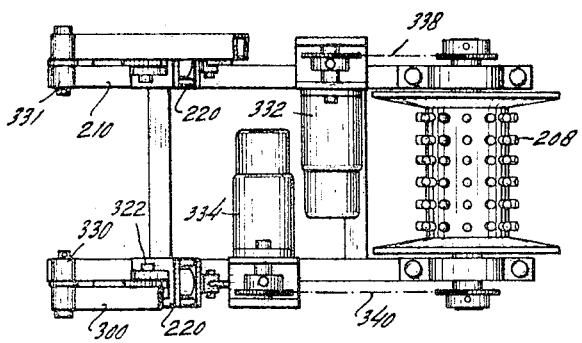
FIG. 10 is a top plan of the upper drive roller pivotable downwardly onto the tree trunk.
Figure 12:
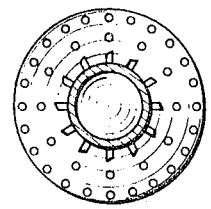
FIG. 12 is a sectional view taken along section line 12—12 of FIG. 11, showing a modified drive roller.
Figure 11:
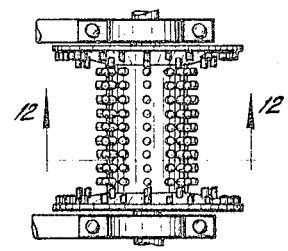
FIG. 11 is a fragmentary top plan of a modified roller showing the roller having side flanges with inwardly extending pins or bullets.

In FIG. 8 the lower drive rollers and cutting knife are illustrated together with the upper drive roller 208 and upper cutting knife 346 as well as the fore vertically pivoted cutting knives 384 and 386. Drive roller 208 is rotatably mounted upon frame 210, independently pivoted as at 330 and 331 within inner frame 300. Driven roller 208 may be provided with dual hydraulic drive motors 332, and 334, including as illustrated in FIG. 10, drive chains 338 and 340. Roller 208 bears the brunt of the tree-pulling load and, therefore, is provided with the dual motors. Hydraulic cylinders 212 secured at their base end to frame 300 by ear 320 by means of pin 332 extend via rod 324 and clevis element 326 to pin 328 for pivoting the drive roller 208 relatively to the path of axial conveyance. During operation the drive roller studs 317 dig into the tree, pulling the tree axially as the delimbing is carried out by the upper and lower, as well as fore cutting knives. As illustrated in FIG. 13 upper cutting knife 346 is rotatably mounted across frame 352. Frame 352 is pivoted to frame 300 by means of pin 354 on either side and is actuated vertically by means of cylinder 356 secured at its base end to the frame 300 by means of clevis assembly 358 and pin 360 and at its other end engaging via rod 362, clevis 364 and pin 370, ears 368 on the frame 352. Frame 352 also has a guide roller 378 extending thereacross, so as to guide the tree during the axial advancing. Cutting knife 346 includes removable blades 348 and may be powered by hydraulic motor 350.

As illustrated in FIG. 9 lower cutting knife 314 is rotatable in a horizontal plane together with driven rollers 204 and 206. The fore cutting knives 384 and 386 as well as the idler rollers 372 are vertically rotatably mounted in identical pivoting frame arms 390 and grids 402. As illustrated in FIG. 5 these elements are pivoted horizontally or laterally via pin 354, so as to be urgeable inwardly towards each other and against the limbs being removed. As illustrated in FIGS. 14 and 15, a hydraulic cylinder assembly 394 extends intermediate the extension arms 390 and via clevis 400 at its base end, piston rod 396 and clevis 398 at its other end. Also, a tension spring 392 extends intermediate the extension arms 390. Fore cutting knives 384 and 386 have individually removable blades 388 secured thereto by means of set screws or lugs 331. Idler rollers 372 may be mounted upon identical shafts 374, secured in brackets 376. As illustrated in FIG. 5, vertical grid 402 supports the idler roller 372 and side cutting knife elements 386 and 384. The side cutting knives are powered by identical hydraulic motors 404 (see FIG. 8). An optional vertical idler roller 408 may be provided in the engine section 14, as illustrated in FIG. 1, so as to longitudinally align the tree trunk 112 within the path of axial conveyance and with respect to roller 202 at the end of the path.

As will be apparent, the vehicle operator is provided with a plurality of options respecting his operation of the shear, tong, and delimbing devices. In standard operation the vehicle operator approaches the tree to be sheared, opens front gate 44 so as to admit the vertical trunk, drops gate 44 behind the tree and, as illustrated in FIG. 5 shears the tree. The operator then picks up the tree with the tongs, as illustrated in FIG. 2 so as to pull the tree to another location or, advances the sheared trunk end into the delimbing rollers and knives. Top driving roller 208 and the upper delimbing knife 348 are then urged downwardly onto the trunk. All delimbing knives are rotating, the fore knives 384 and 386 floating on the surface of the tree trunk on either side and the top knife 314 floating on top of the log. As the tree is advanced through the delimbing assembly (FIGS. 3 and 4), the top may be sheared off by the tong, as the delimbed trunk is discharged rearwardly of the vehicle into the desired bunches on the ground.

Various types of hydraulic power systems may be employed and the knives may be rotated at various speeds, depending upon the weight of the knife employed. The drive rollers are reversible so as to eject the tree when trouble is encountered and the cutting knives may be operated in the range 2,300 or 2,400 r.p.m. or greater, if the knives are heavier. Since the upper and fore knives float along the top and side surfaces of the trunk, they essentially follow the "bow of the log," eliminating the necessity for complex following elements as required in conventional devices.

We claim:

1. A tonge and shear tree felling, topping and delimbing device comprising:
  (A) a movable vehicle;
  (B) a frame pivoted at one end to said vehicle and configured as a ground engaging sled at its free end;
  (C) a tree-engaging shear blade reciprocably mounted adjacent the free end of said frame so as to be horizontally advanceable through a tree trunk encompassed by said frame;
  (D) an end gate pivotally mounted at one end thereof on said frame and extending across the free end of said frame in opposed relationship to said shear blade, the pivotal axis of said end gate extending parallel to the direction of reciprocation of said shear blade, said gate in closed position extending across said frame and engaging the rear of a tree during advancing of said blade through said tree and said gate being pivotable laterally of said frame to gate opening position, while engaging and lifting said tree after shearing to one side of said frame;
  (E) a longitudinally extensible tree-engaging tong superposed with respect to said shear and pivoted vertically with respect to said vehicle upon a lateral axis supported upon said vehicle above said shear blade, said tong including cutting elements for tree topping; and
  (F) a plurality of tree-engaging delimbing rollers and knives defining a path of axial conveyance astride said mobile vehicle and away from said tong, said driving rollers and knives being urgeable into the path of said conveyance so as to engage peripherally said tree trunk.

2. A tong and shear tree felling, topping and delimbing device as in claim 1 said vehicle shear, gate, tong and delimbing elements being hydraulically driven.

3. A tong and shear tree felling, topping and delimbing device as in claim 2, said delimbing rollers and knives being mounted in a frame vertically pivotable at one end of said path of axial conveyance, so as to admit a sheared tree trunk end into said conveyance, then pivot said trunk to a horizontal position within said path of axial conveyance.

References Cited

UNITED STATES PATENTS

| | | | |
|---|---|---|---|
| 2,542,952 | 2/1951 | White | 144—34 XR |
| 3,074,446 | 1/1963 | Earl | 144—3 |
| 3,323,563 | 6/1967 | Larson | 144—3 XR |
| 3,308,861 | 3/1967 | Hamilton | 144—3 |

FRANCIS S. HUSAR, Primary Examiner

U.S. Cl. X.R.

144—34